United States Patent
Xu et al.

(10) Patent No.: US 12,160,680 B2
(45) Date of Patent: Dec. 3, 2024

(54) VIDEO IMAGE DISPLAY METHOD AND APPARATUS, MULTIMEDIA DEVICE AND STORAGE MEDIUM

(71) Applicant: SHENZHEN SKYWORTH-RGB ELECTRONIC CO., LTD., Shenzhen (CN)

(72) Inventors: Yaoling Xu, Shenzhen (CN); Jian Li, Shenzhen (CN); Wensheng Hong, Shenzhen (CN); Yanzhu Sun, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 10 days.

(21) Appl. No.: 18/166,682

(22) Filed: Feb. 9, 2023

(65) Prior Publication Data
US 2023/0179734 A1    Jun. 8, 2023

Related U.S. Application Data

(63) Continuation of application No. PCT/CN2021/106254, filed on Jul. 14, 2021.

(30) Foreign Application Priority Data

Aug. 26, 2020  (CN) ......................... 202010874887.2

(51) Int. Cl.
*H04N 5/262*    (2006.01)
*H04N 5/265*    (2006.01)

(52) U.S. Cl.
CPC ........... *H04N 5/2628* (2013.01); *H04N 5/265* (2013.01)

(58) Field of Classification Search
CPC .... H04N 5/2628; H04N 5/265; H04N 13/366; H04N 21/4312; H04N 21/44; H04N 21/44218

(Continued)

(56) References Cited

U.S. PATENT DOCUMENTS 5,488,434 A    1/1996 Jung
6,501,468 B1   12/2002 Kaji (Continued)

FOREIGN PATENT DOCUMENTS

CN    101950550 A    1/2011
CN    103024191 A    4/2013

(Continued)

OTHER PUBLICATIONS

First Office Action issued in counterpart Chinese Patent Application No. 202010874887.2, dated Dec. 30, 2021.

(Continued)

*Primary Examiner* — Sherrie Hsia
(74) *Attorney, Agent, or Firm* — Westbridge IP LLC

(57) ABSTRACT

Disclosed is a video image display method, applied to a multimedia device. The video image display method includes acquiring a target image in a preset area; in response that the target image has a left eye object and a right eye object, determining spatial positional data of the left eye object and the right eye object respectively relative to the multimedia device according to the target image; determining a deflection coefficient of a to-be-displayed video image according to the spatial positional data of the left eye object and the right eye object respectively relative to the multimedia device; deflecting the to-be-displayed video image according to the deflection coefficient to obtain (Continued)

a target video image after deflecting. Disclosed also are a video image display apparatus, a multimedia device and a storage medium.

20 Claims, 8 Drawing Sheets

(58) Field of Classification Search
USPC ......... 348/580, 739, 578, 51–54; 345/6, 419
See application file for complete search history.

(56) References Cited

U.S. PATENT DOCUMENTS

| | | | |
|---|---|---|---|
| 2007/0292050 | A1 | 12/2007 | Kuo |
| 2013/0182014 | A1 | 7/2013 | Park et al. |
| 2014/0240357 | A1 | 8/2014 | Hou |
| 2014/0333739 | A1* | 11/2014 | Yang ............... H04N 13/139 348/54 |
| 2015/0370324 | A1 | 12/2015 | Sullivan et al. |

FOREIGN PATENT DOCUMENTS

| | | |
|---|---|---|
| CN | 103517060 A | 1/2014 |
| CN | 103760980 A | 4/2014 |
| CN | 104122985 A | 10/2014 |
| CN | 104182114 A | 12/2014 |
| CN | 104618705 A | 5/2015 |
| CN | 107704176 A | 2/2018 |
| CN | 108388849 A | 8/2018 |
| CN | 109040736 A | 12/2018 |
| CN | 109558842 A | 4/2019 |
| CN | 109769113 A | 5/2019 |
| CN | 110046546 A | 7/2019 |
| CN | 110597391 A | 12/2019 |
| CN | 112040316 A | 12/2020 |
| JP | 2009086703 A | 4/2009 |

OTHER PUBLICATIONS

International Search Report and Written Opinion issued in corresponding PCT Application No. PCT/CN2021/106254, dated Oct. 13, 2021.
Ren et al., Image Retargeting Based on Region Relation Graph, Journal of Software, vol. 21, No. 9, pp. 2237-2249, dated Sep. 15, 2010.
Extended European Search Report issued in counterpart Europe Patent Application No. 21859951.2, dated Jun. 20, 2024.
First Examination Report issued in counterpart Indian Patent Application No. 202327009417, dated Jul. 1, 2024.

* cited by examiner

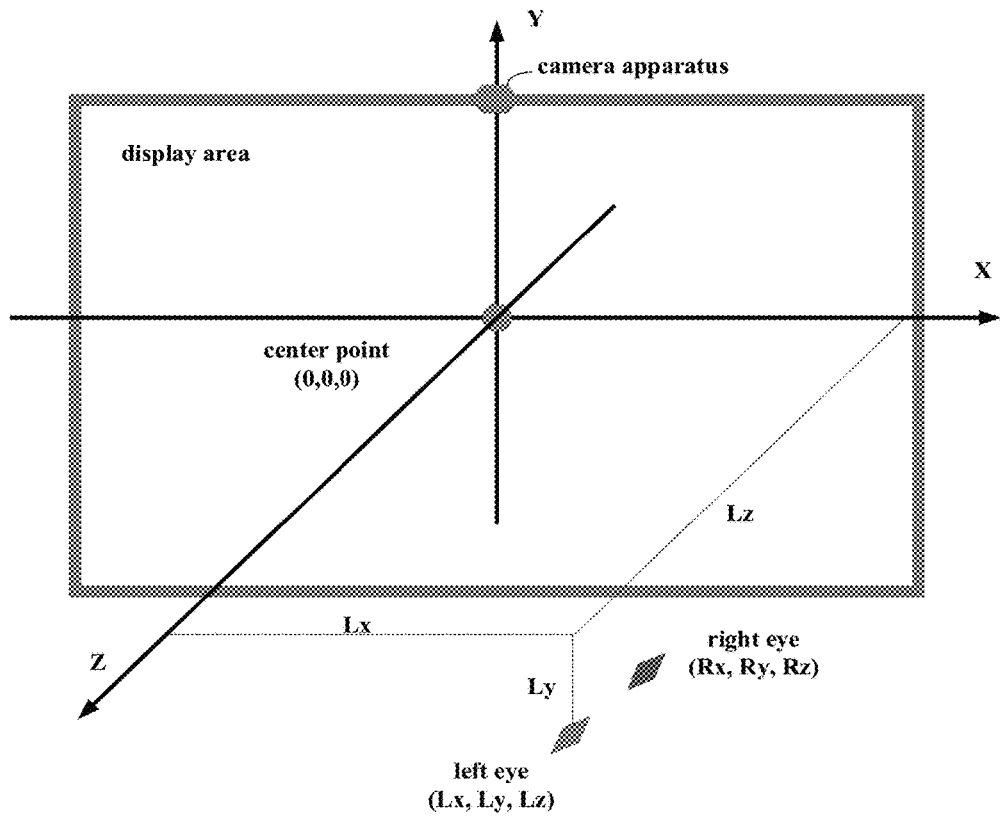

FIG. 3

```
┌─────────────────────────────────────────────────────────────────┐  ┌─ S211
│ processing the target image according to a preset image-processing rule to
│                         obtain a frame image
└─────────────────────────────────────────────────────────────────┘
                                  ↓
┌─────────────────────────────────────────────────────────────────┐  ┌─ S221
│ in response that the target image has the left eye object and the right eye
│  object, determining the spatial positional data of the left eye object and
│     the right eye object respectively relative to the multimedia device
│      according to the frame image and a preset position-processing rule
└─────────────────────────────────────────────────────────────────┘
```

FIG. 4 acquiring an image: capturing the scene viewed by the user by using a TV camera apparatus; converting the optical signal image into an electrical signal image; performing noise reduction, signal enhancement, white balance correction and other processing to obtain the frame image d′ P₽ and the pixel matrix of the frame image P, which is 2M*2N, and outputting the frame image d′ P₽ obtaining the spatial coordinates of the human eye by performing object recognition, face recognition, and human eye positioning on the frame image d′ P₽ to obtain the left eye object and the right eye object; calculating the z-direction coordinate values Lz and Rz according to the spatial spectrum analysis; after converting the position of the frame image d′ P₽ pixel into a plane coordinate value, calculating the x-direction coordinate values Lx and Rx and the y-direction coordinate values Ly and Ry; and outputting the three-dimensional space coordinates (Lx, Ly, Lz) of the left eye object and the three-dimensional space coordinates (Rx, Ry, Rz) of the right eye object generating a coefficient: based on the three-dimensional space coordinate values (Lx, Ly, Lz) and (Rx, Ry, Rz) of the left eye object and the right eye object, calculating the horizontal deflection coefficient and the vertical deflection coefficient and outputting the deflection coefficients conversing the video: receiving the video image VP output by the signal source, rotating the video image VP according to the horizontal deflection coefficient and the vertical deflection coefficient to obtain the video image VP_R; zooming and intercepting the video image VP_R to obtain VP_Z; filling the void area to obtain D_P; and splicing and rendering VP_Z and D_P to generate a new video image VP_A displaying video, the display screen displays the video image VP_A after processing, and the user watches the video

FIG. 13

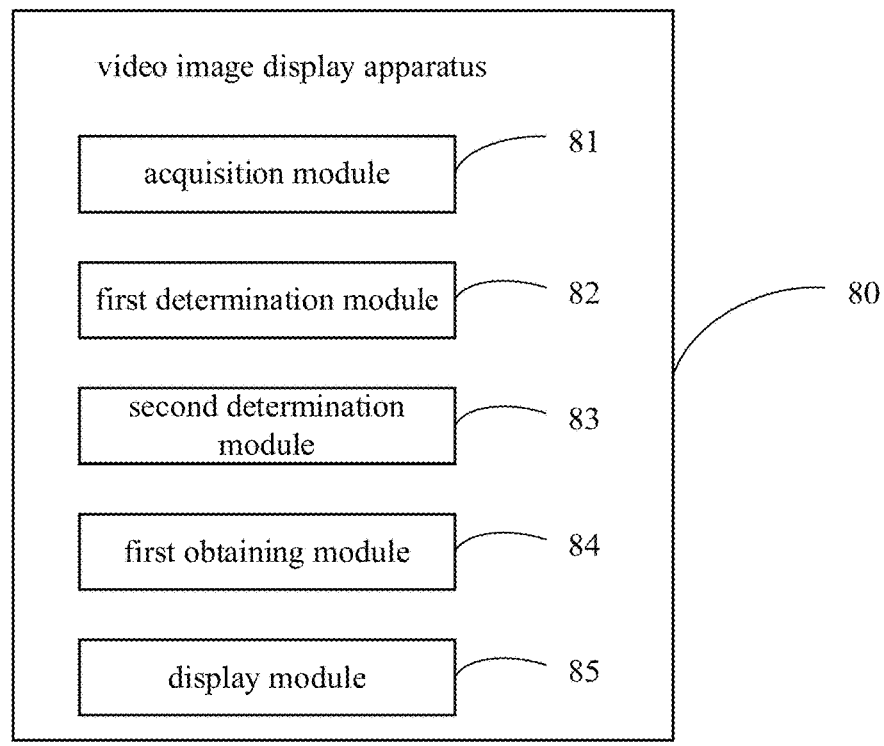

FIG. 14

VIDEO IMAGE DISPLAY METHOD AND APPARATUS, MULTIMEDIA DEVICE AND STORAGE MEDIUM

CROSS-REFERENCE TO RELATED APPLICATIONS

This application is a continuation application of International Application No. PCT/CN2021/106254, filed on Jul. 14, 2021, which claims priority to Chinese Patent Application No. 202010874887.2, filed on Aug. 26, 2020. The disclosures of the above-mentioned applications are incorporated herein by reference in their entireties.

TECHNICAL FIELD

The present disclosure relates to the technical field of image display, and in particular, to a video image display method, a video image display apparatus, a multimedia device and a storage medium.

BACKGROUND

With the improvement of living standards and the development of science and technology, multimedia devices play an increasingly important role in people's daily life. Multimedia devices usually have a display area for displaying video images. Users can have visual experience by watching the displayed video images.

Under normal circumstances, when the user's eyes are located directly in front of the center point of the display area, the viewing effect will be the best. However, the user will not stay still, and the viewing position may not be directly in front of the center point of the display area. When the human eyes are not located directly in front of the center point of the display area, the viewing effect will decrease. In addition, as the angle of the human eyes away from the center point increases, the viewing effect gradually turn worse. However, there is no good video image display method in the related art to solve the existing problem of poor display effect when multimedia devices display video images.

SUMMARY

The main objective of the present disclosure is to provide a video image display method, a video image display apparatus, a multimedia device and a storage medium, which aims to solve the existing technical problem of poor display effect when multimedia devices display video images.

In order to achieve the above objective, the present disclosure provides a video image display method applied to a multimedia device, the video image display method includes:
  acquiring a target image in a preset area;
  in response that the target image has a left eye object and a right eye object, determining spatial positional data of the left eye object and the right eye object respectively relative to the multimedia device according to the target image;
  determining a deflection coefficient of a to-be-displayed video image according to the spatial positional data of the left eye object and the right eye object respectively relative to the multimedia device;
  deflecting the to-be-displayed video image according to the deflection coefficient to obtain a target video image after deflecting;
  displaying the target video image.

In addition, in order to achieve the above objective, the present disclosure further provides a video image display apparatus applied to a multimedia device, the video image display apparatus includes:
  an acquisition module configured to acquire a target image in a preset area;
  a first determination module configured to determine spatial positional data of a left eye object and a right eye object respectively relative to the multimedia device according to the target image, in response that the target image has the left eye object and the right eye object;
  a second determination module configured to determine a deflection coefficient of a to-be-displayed video image according to the spatial positional data of the left eye object and the right eye object respectively relative to the multimedia device;
  a first obtaining module configured to deflect the to-be-displayed video image according to the deflection coefficient to obtain a target video image after deflecting;
  a display module configured to display the target video image.

In addition, in order to achieve the above objective, the present disclosure further provides a multimedia device. The multimedia device includes a memory, a processor, and a video image display program stored on the memory and executed by the processor. The processor, when executing the video image display program, implements operations of any one of the aforementioned video image display methods.

In addition, in order to achieve the above objective, the present disclosure provides a storage medium, the storage medium stores a video image display program. The video image display program, when executed by a processor, implements operations of any one of the aforementioned video image display methods.

The present disclosure provides a video image display method applied to a multimedia device. The target image in a preset area is acquired, then the spatial positional data of the left eye object and the right eye object respectively relative to the multimedia device is obtained according to the target image, in response that the target image has a left eye object and a right eye object. A deflection coefficient of a to-be-displayed video image is determined according to the spatial positional data of the left eye object and the right eye object respectively relative to the multimedia device. Further, the to-be-displayed video image is deflected according to the deflection coefficient to obtain a target video image after deflecting. In the present disclosure, since the deflection coefficient adopted during deflecting the video image is obtained according to the spatial positional data of the left eye object and the right eye object, the target video image after deflecting can be directly facing the human eyes when being displayed. Thus, people in different locations seem to watch the video image right ahead, which realizes "images moving following eyes" and improves the effect of displaying video images of multimedia device.

BRIEF DESCRIPTION OF THE DRAWINGS

In order to more clearly illustrate the technical solutions in the embodiments of the present disclosure or in the related art, drawings in the embodiments or in the related art will be briefly described below. Obviously, the drawings in the following description are only some embodiments of the present disclosure. Other drawings can be obtained by those skilled in the art according to the structures shown in the drawings without creative work.

FIG. 3 is a schematic spatial view of a multimedia device, a camera apparatus, a left eye object and a right eye object according to an embodiment of the present disclosure.

FIG. 4 is a schematic flowchart of a video image display method according to an embodiment of the present disclosure.

FIG. 13 is a schematic flowchart of a principle of a video image display method according to an embodiment of the present disclosure.

FIG. 14 is a schematic structural view of a video image display apparatus according to an embodiment of the present disclosure.

The implementation, functional characteristics and advantages of the present disclosure will be further described with reference to the attached drawings in combination with embodiments.

DETAILED DESCRIPTION OF THE EMBODIMENTS

It should be understood that the specific embodiments of the present disclosure described herein are only used to explain the present disclosure, and do not limit the present disclosure.

The creative concept of the embodiments of the present disclosure lies in: by locating the positions of people's left eye and right eye in the target image acquired, the spatial positional data of the left eye object and the right eye object respectively relative to the multimedia device is determined. Further, a deflection coefficient of a to-be-displayed video image is determined according to the spatial positional data of the left eye object and the right eye object respectively relative to the multimedia device. Finally, the to-be-displayed video image is deflected according to the deflection coefficient. In this way, the displaying video images in the multimedia device will be deflected according to the left eye object and the right eye object in the target image, such that the video image displayed in the multimedia always directly face the left eye and right eye. Thus, people in different locations seem to watch the video image right ahead, which realizes "images moving following eyes" and improves the video images displaying effect of multimedia device.

Figure 1:
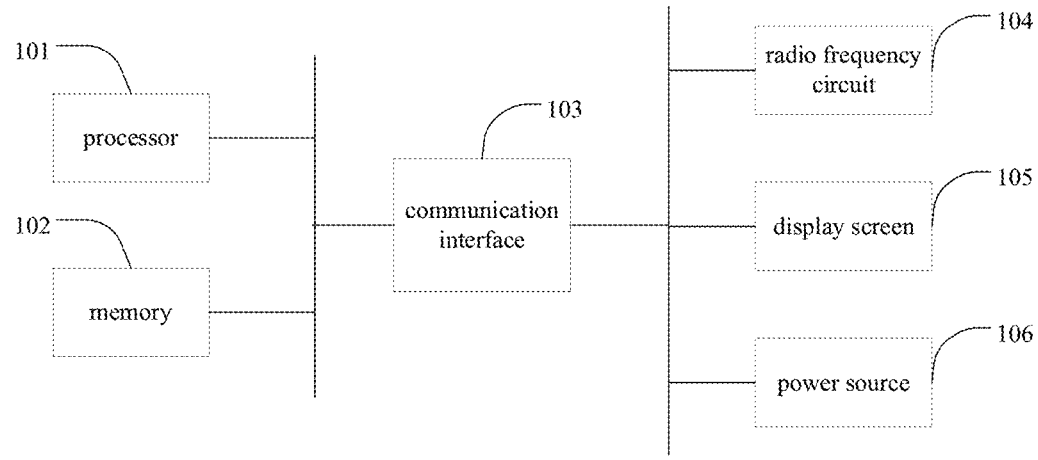
FIG. 1 is a schematic structural view of a terminal device in a hardware operating environment according to some embodiments of the present disclosure.

Based on the above creative concept, some embodiments of the disclosure provide a video image display method. As shown in FIG. 1, FIG. 1 is a schematic structural view of a terminal device in a hardware operating environment according to some embodiments of the present disclosure.

Multimedia devices refer to electronic devices used to display signal sources, which can be televisions (TVs), PCs, mobile phones, tablets, electronic whiteboards, or computer monitors.

Usually, the multimedia device includes at least one processor 101, a memory 102, and a video image display program stored on the memory and executed by the processor. The video image display program is configured to implement the operations of the video image display method described in any of the following embodiments.

The processor 101 may include one or more processing cores, such as a 4-core processor, an 8-core processor, and the like. The processor 101 can adopt at least one hardware of Digital Signal Processing (DSP), Field-Programmable Gate Array (FPGA) and Programmable Logic Array (PLA). The processor 101 may also include a main processor and a coprocessor, the main processor is a processor for processing data in a wake-up state, and is also called a Central Processing Unit (CPU). The coprocessor refers to a low-power processor for processing data in a standby state. In some embodiments, the processor 101 may be integrated with a Graphics Processing Unit (GPU) which is used to render and draw the content to be displayed on the display screen. The processor 101 may also include an Artificial Intelligence (AI) processor, which is used to process operations related to the video image display method, such that the video image display method model can be trained and learned independently, improving efficiency and accuracy.

The memory 102 may include one or more computer-readable storage media, which may be non-transitory. The memory 102 may also include high-speed random access memory and non-volatile memory, such as one or more magnetic disk storage devices and flash memory storage devices. In some embodiments, the non-transitory computer-readable storage medium in the memory 102 is used to store at least one instruction, and the at least one instruction is used to be executed by the processor 101 to realize the video image display method provided in the embodiments of the present disclosure.

In some embodiments, the multimedia device may optionally further include a communication interface 103 and at least one peripheral device. The processor 101, the memory 102, and the communication interface 103 may be connected through a bus or a signal line. Each peripheral device can be connected to the communication interface 103 through a bus, a signal line or a circuit board. Specifically, the peripheral device includes at least one of a radio frequency circuit 104, a display screen 105 and a power supply 106.

The communication interface 103 may be used to connect at least one peripheral device related to I/O (Input/Output) to the processor 101 and the memory 102. In some embodiments, the processor 101, the memory 102 and the communication interface 103 are integrated on the same chip or circuit board. In some other embodiments, any one or two of the processor 101, the memory 102 and the communication interface 103 can be on a separate chip or circuit board, which is not limited in these embodiments.

The radio frequency circuit 104 is configured to receive and transmit Radio Frequency (RF) signals which are also called electromagnetic signals. The radio frequency circuit 104 is communicated with the communication network and other communication devices through electromagnetic signals. The radio frequency circuit 104 converts electrical signals into electromagnetic signals for transmission, or converts electromagnetic signals received into electrical signals. In an embodiment, the radio frequency circuit 104 includes an antenna system, an RF transceiver, one or more amplifiers, a tuner, an oscillator, a digital signal processor, a codec chipset, a subscriber identity module card, and the like. The radio frequency circuit 104 can communicate with other terminal devices through at least one wireless communication protocol. The wireless communication protocol includes, but is not limited to a metropolitan area network, various generations of mobile communication networks (2G, 3G, 4G and 5G), a wireless local area network and/or a Wireless Fidelity (WiFi) network. In some embodiments, the radio frequency circuit 104 may also include circuits related to Near Field Communication (NFC), which is not limited in the present disclosure.

The display screen 105 is used to display a User Interface (UI). The UI can include graphics, text, icons, video, and any combination thereof. When the display screen 105 is a touch display screen, the display screen 105 also has the ability to collect touch signals on or above the surface of the display screen 105. The touch signal can be input to the processor 101 as a control signal for processing. Meanwhile, the display screen 105 can also be used to provide virtual buttons and/or virtual keyboards which are also respectively called soft buttons and/or soft keyboards. In some embodiments, the display screen 105 can be a front panel of the electronic device. In other embodiments, there can be at least two display screens 105, which are respectively arranged on different surfaces of the electronic device or in a folded design. In some embodiments, the display screen 105 may be a flexible display screen, which is arranged on a curved surface or a folded surface of the electronic device. Furthermore, the display screen 105 can also be set as a non-rectangular irregular figure, that is, a special-shaped screen. The display screen 105 may be made of Liquid Crystal Display (LCD), Organic Light-Emitting Diode (OLED) and other materials.

The power supply 106 is used to supply power to various components in the electronic device. The power supply 106 may be alternating current, direct current, disposable batteries, or rechargeable batteries. If the power source 106 includes a rechargeable battery, the rechargeable battery may support wired charging or wireless charging. The rechargeable battery can also be used to support fast charging technology.

It should be understood to those skilled in the art that the structure shown in FIG. 1 does not limit the display device, which may include more or less components than shown in the figure, or a combination of components, or differently arranged components.

In addition, the present disclosure also provides a storage medium, the storage medium stores a video image display program. The video image display program, when executed by a processor, implements operations of the video image display method in any one of the following embodiments. Therefore, details will not be repeated here. In addition, the description of the beneficial effect of adopting the same method will not be repeated here. For the technical details not disclosed in the embodiments of the computer-readable storage medium involved in the present disclosure, please refer to the description of the method embodiments of the present disclosure. For example, program instructions can be deployed and executed on one computing device, or on multiple computing devices located at one site, or alternatively, on multiple computing devices distributed across multiple sites and interconnected by a communication network.

It should be understood to those skilled in the art that all or part of the processes in the method of any of the following embodiments can be implemented by related hardware according to the instruction made by computer programs. The video image display program can be stored in a computer-readable storage medium. When the program is executed, the method operations in the following embodiments can be performed. The above-mentioned storage medium may be a magnetic disk, an optical disk, a Read-Only Memory (ROM), or a Random Access Memory (RAM).

Based on the above hardware structure, the present disclosure further provides some embodiments of the video image display method.

Figure 2:
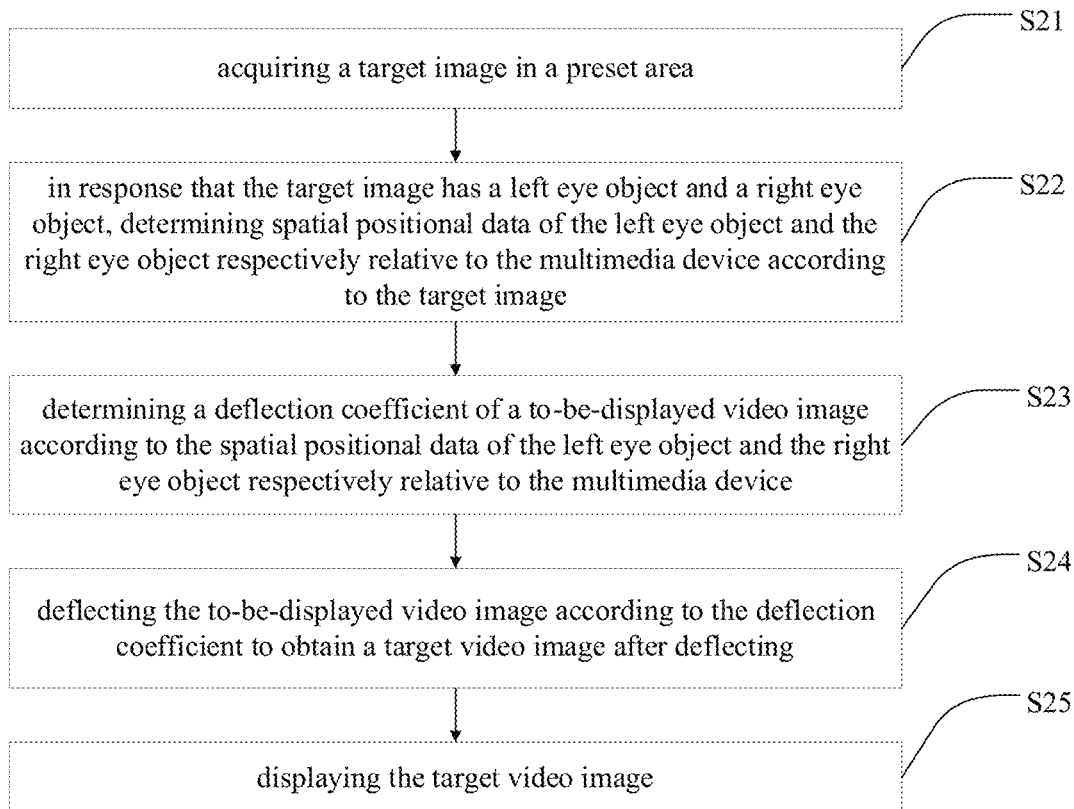
FIG. 2 is a schematic flowchart of a video image display method according to an embodiment of the present disclosure.

As shown in FIG. 2, FIG. 2 is a schematic flowchart of a video image display method according to an embodiment of the present disclosure. The video image display method applied to a multimedia device includes the following operations:

Operation S21, acquiring a target image in a preset area;

Operation S22, in response that the target image has a left eye object and a right eye object, determining spatial positional data of the left eye object and the right eye object respectively relative to the multimedia device according to the target image;

Operation S23, determining a deflection coefficient of a to-be-displayed video image according to the spatial positional data of the left eye object and the right eye object respectively relative to the multimedia device;

Operation S24, deflecting the to-be-displayed video image according to the deflection coefficient to obtain a target video image after deflecting;

Operation S25, displaying the target video image.

In these embodiments, the multimedia device has an image acquisition function. Specifically, the image acquisition function can be realized by installing one or more camera apparatus on the multimedia device. The camera apparatus can be installed on the side of the display area of the multimedia device. FIG. 3 is a schematic spatial view of a multimedia device, a camera apparatus, a left eye object and a right eye object according to an embodiment of the present disclosure. As shown in FIG. 3, the camera apparatus can be installed on the top of the display area of the multimedia device. After installation, the viewing angle area captured by the camera apparatus is called the preset area.

After collecting the target image through the camera apparatus, the multimedia device can analyze the target image to determine whether the target image has a left eye object and a right eye object. If the target image has a left eye object and a right eye object, then further according to the target image, the respective spatial positional data of the left eye object and the right eye object based on the multimedia device is determined, which can locate the positions of the left eye object and the right eye object in the target image.

After the multimedia device determines the respective spatial positional data of the left eye object and the right eye object based on the multimedia device, the deflection coefficient of the video image to be displayed can be determined according to the respective spatial positional data of the left eye object and the right eye object based on the multimedia device.

In some embodiments, the image to be displayed may be an image from an external signal source. Specifically, the multimedia device may receive a video image from an external signal source through a wired data interface or a wireless network interface, and the image to be displayed may also be a pre-stored video image in the memory of the multimedia device. These embodiments do not specifically limit the type and source of the signal source of the multimedia device.

After determining the deflection coefficient of the video image to be displayed, the multimedia device can perform deflection processing on the video image to be displayed according to the deflection coefficient to obtain the deflected target video image, thereby to directly display the deflected target video image to the user for viewing.

By adopting the video image display method of these embodiments, a target image in a preset area is collected, and the respective spatial positional data of the left eye object and the right eye object based on the multimedia device is determined according to the target image, in response that the target image has a left eye object and a right eye object. A deflection coefficient of a to-be-displayed video image is determined according to the spatial positional data of the left eye object and the right eye object respectively relative to the multimedia device. Further, the to-be-displayed video image is deflected according to the deflection coefficient to obtain a target video image after deflecting. Finally, the target video image is obtained after deflecting. In the present disclosure, since the deflection coefficient adopted during deflecting the video image is obtained according to the spatial positional data of the left eye object and the right eye object, the target video image after deflecting can be directly facing the human eyes when being displayed. Thus, people in different locations seem to watch the video image right ahead, which realizes "images moving following eyes" and improves the effect of displaying video images of multimedia device.

As shown in FIG. 4, FIG. 4 is a schematic flowchart of a video image display method according to an embodiment of the present disclosure. In one embodiment, in order to conveniently determine the spatial positional data of the left eye object and the right eye object respectively based on the multimedia device, after the above operation S21, the video image display method of the present disclosure may further include the following operation:

Operation S211, processing the target image according to a preset image-processing rule to obtain a frame image.

In this embodiment, the target image can be sequentially subjected to noise reduction, signal enhancement, white balance correction, edge correction and other processing, and then a frame image "P" is obtained. The pixel matrix of the frame image "P" can be 2M*2N. Any suitable existing technologies may be used for the above noise reduction, signal enhancement, white balance correction, edge correction and other processing, which will not be repeated here.

Accordingly, the operation S22 further includes the following operation:

Operation S221, in response that the target image has the left eye object and the right eye object, determining the spatial positional data of the left eye object and the right eye object respectively relative to the multimedia device according to the frame image and a preset position-processing rule.

In this embodiment, determining the spatial positional data of the left eye object and the right eye object respectively relative to the multimedia device is provided. Specifically, when the left eye object and the right eye object are included in the frame image, the spatial positional data of the left eye object and the right eye object respectively relative to the multimedia device can be determined according to the frame image and a preset position-processing rule. Such that it can be conveniently determined that the spatial positional data of the left eye object and the right eye object respectively relative to the multimedia device.

Figure 5:
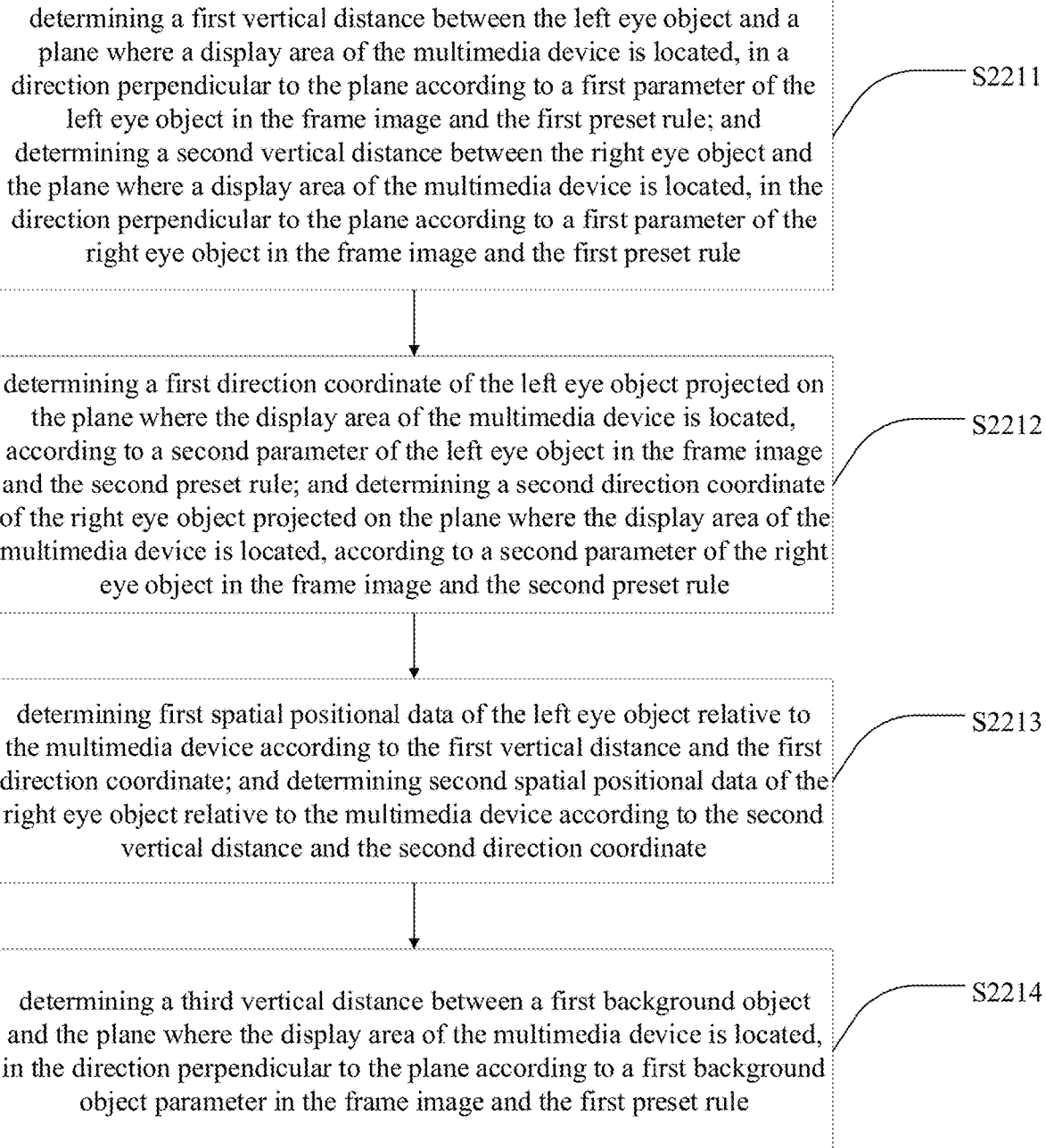
FIG. 5 is a schematic flowchart of a video image display method according to an embodiment of the present disclosure.

As shown in FIG. 5, FIG. 5 is a schematic flowchart of a video image display method according to an embodiment of the present disclosure. In a specific embodiment, the preset position-processing rule includes a first preset rule and a second rule. The operation S221 includes the following operations:

Operation S2211, determining a first vertical distance between the left eye object and a plane where a display area of the multimedia device is located, in a direction perpendicular to the plane according to a first parameter of the left eye object in the frame image and the first preset rule; and determining a second vertical distance between the right eye object and the plane where a display area of the multimedia device is located, in the direction perpendicular to the plane according to a first parameter of the right eye object in the frame image and the first preset rule;

Operation S2212, determining a first direction coordinate of the left eye object projected on the plane where the display area of the multimedia device is located, according to a second parameter of the left eye object in the frame image and the second preset rule; and determining a second direction coordinate of the right eye object projected on the plane where the display area of the multimedia device is located, according to a second parameter of the right eye object in the frame image and the second preset rule; and Operation S2213, determining first spatial positional data of the left eye object relative to the multimedia device according to the first vertical distance and the first direction coordinate; and determining second spatial positional data of the right eye object relative to the multimedia device according to the second vertical distance and the second direction coordinate.

In this embodiment, the respective spatial positional data of the left eye object and the right eye object based on the multimedia device may be three-dimensional space coordinates with the center of the display area of the multimedia device as the coordinate origin. Therefore, the first vertical distance between the left eye object and the plane where the display area of the multimedia device is located in the vertical direction can be determined and represented by Lz, and then the first direction coordinate of the left eye object projected on the plane where the display area of the multimedia device is located can be determined and represented by (Lx, Ly), finally the first vertical distance and the first direction coordinate are combined to obtain the first spatial positional data (Lx, Ly, Lz) of the left eye object based on the multimedia device. Likewise, the second vertical distance between the right eye object and the plane where the display area of the multimedia device is located in the vertical direction can be determined and represented by Rz, and then the second direction coordinate of the right eye object projected on the plane where the display area of the multimedia device is located can be determined and represented by (Rx, Ry), finally the second vertical distance and the second direction coordinate are combined to obtain the second spatial positional data (Rx, Ry, Rz) of the right eye object based on the multimedia device.

Figure 6:
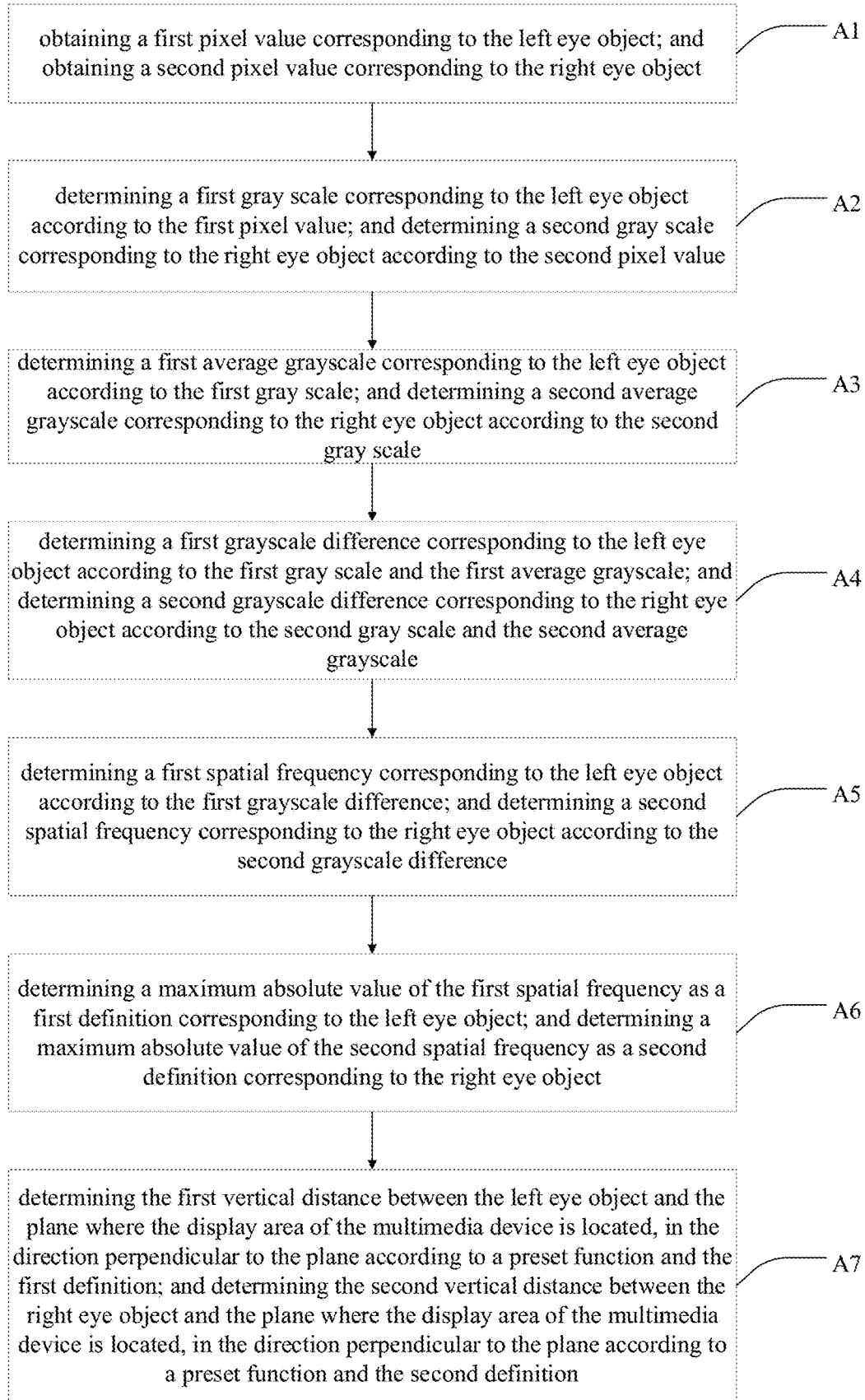
FIG. 6 is a schematic flowchart of a video image display method according to an embodiment of the present disclosure.

As shown in FIG. 6, FIG. 6 is a schematic flowchart of a video image display method according to an embodiment of the present disclosure. In one embodiment, the above operation S2211 may specifically include the following operations:

Operation A1, obtaining a first pixel value corresponding to the left eye object; and obtaining a second pixel value corresponding to the right eye object;

Operation A2, determining a first gray scale corresponding to the left eye object according to the first pixel value; and determining a second gray scale corresponding to the right eye object according to the second pixel value;

Operation A3, determining a first average grayscale corresponding to the left eye object according to the first gray scale; and determining a second average grayscale corresponding to the right eye object according to the second gray scale;

Operation A4, determining a first grayscale difference corresponding to the left eye object according to the first gray scale and the first average grayscale; and determining a second grayscale difference corresponding to the right eye object according to the second gray scale and the second average grayscale;

Operation A5, determining a first spatial frequency corresponding to the left eye object according to the first grayscale difference; and determining a second spatial frequency corresponding to the right eye object according to the second grayscale difference;

Operation A6, determining a maximum absolute value of the first spatial frequency as a first definition corresponding to the left eye object; and determining a maximum absolute value of the second spatial frequency as a second definition corresponding to the right eye object; and Operation A7, determining the first vertical distance between the left eye object and the plane where the display area of the multimedia device is located, in the direction perpendicular to the plane according to a preset function and the first definition; and determining the second vertical distance between the right eye object and the plane where the display area of the multimedia device is located, in the direction perpendicular to the plane according to a preset function and the second definition.

In one embodiment, the video image display method of the disclosure may specifically include the following operation:

Operation S2214, determining a third vertical distance between a first background object and the plane where the display area of the multimedia device is located, in the direction perpendicular to the plane according to a first background object parameter in the frame image and the first preset rule.

Figure 7:
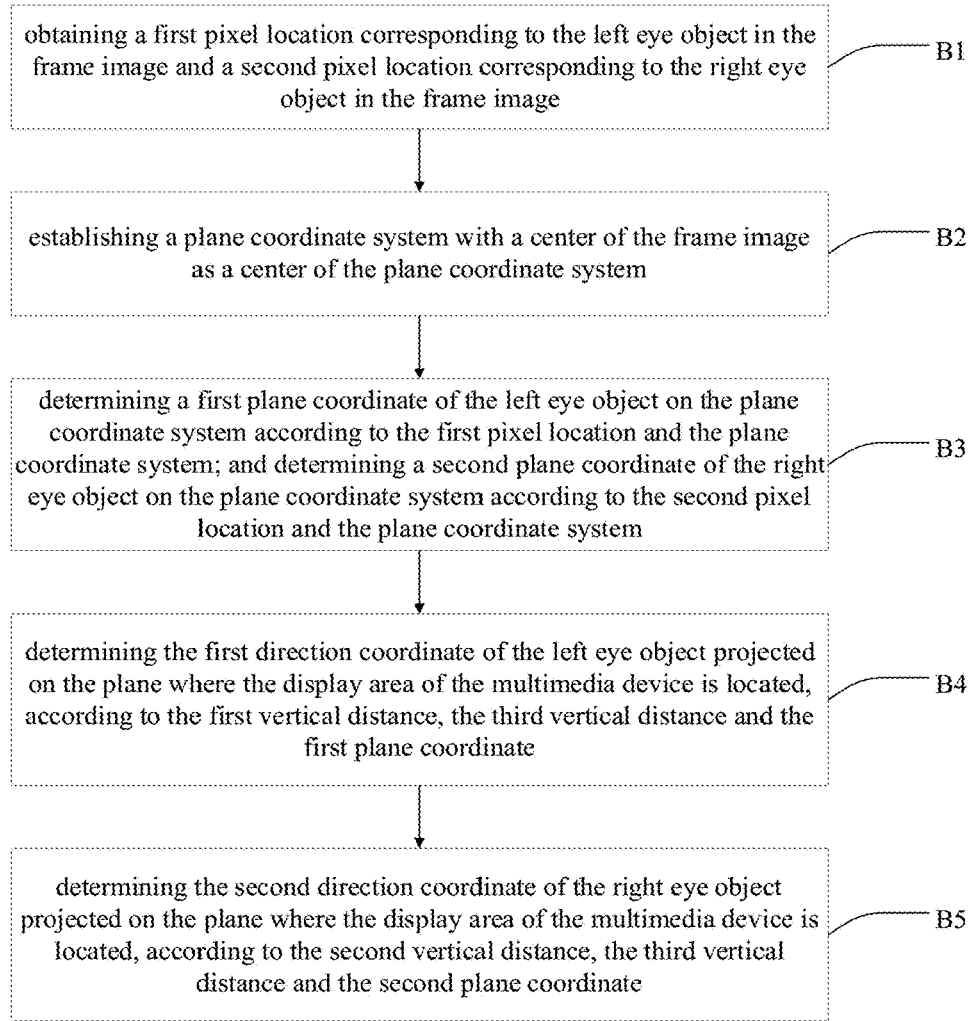
FIG. 7 is a schematic flowchart of a video image display method according to an embodiment of the present disclosure.

As shown in FIG. 7, FIG. 7 is a schematic flowchart of a video image display method according to an embodiment of the present disclosure. In combination with the above embodiments, the above operation S2212 may specifically include the following operations:

Operation B1, obtaining a first pixel location corresponding to the left eye object in the frame image and a second pixel location corresponding to the right eye object in the frame image;

Operation B2, establishing a plane coordinate system with a center of the frame image as a center of the plane coordinate system;

Operation B3, determining a first plane coordinate of the left eye object on the plane coordinate system according to the first pixel location and the plane coordinate system; and determining a second plane coordinate of the right eye object on the plane coordinate system according to the second pixel location and the plane coordinate system;

Operation B4, determining the first direction coordinate of the left eye object projected on the plane where the display area of the multimedia device is located, according to the first vertical distance, the third vertical distance and the first plane coordinate; and Operation B5, determining the second direction coordinate of the right eye object projected on the plane where the display area of the multimedia device is located, according to the second vertical distance, the third vertical distance and the second plane coordinate.

The above-mentioned operations A1-A7 are described in detail below:

The first pixel value corresponding to the left eye object is the first parameter of the left eye object, and the second pixel value corresponding to the right eye object is the first parameter of the right eye object.

After sequentially performing noise reduction, signal enhancement, white balance correction, edge correction and other processing on the target image to obtain the frame image "P", the frame image "P" is analyzed to identify the human body contour information according to the brightness, change information of image pixels and object outline information, and the human body object is separated from the image frame according to the human body contour information to obtain the user object. Meanwhile, the frame image P is analyzed to separate the first background object according to the occlusion and spatial position of the object in the image. Then, the user object is analyzed to recognize the human face according to the composition of the human body features, and the human eye object is found according to the geometric characteristics and brightness change information of the human face after the human face is recognized, then the human eye object is separated from the human face to obtain the left eye object and the right eye object, thereby to realize the human eye positioning.

The first background object refers to the background farthest from the display area in the frame image "P" corresponding to in the actual scene. For example, in an actual scene, the user is sitting on the sofa, and the sofa is located between the multimedia device and the background wall, then the collected target image includes a user, a sofa, and a background wall. At this time, the user object is the user himself, and the first background object is the background wall.

Assuming that the distance directly in front of the display area of the multimedia device is represented by Dz, the corresponding definition is represented by Qz, and β represents a preset function, which, for example, can be a parabolic function opening downwards whose parabola vertex is in the first quadrant of the plane Cartesian coordinate system. Meanwhile, the definition at the standard distance Ds directly in front of the display area is the standard definition Qs. When the distance directly in front of the display area is 0, the definition is the standard definition Q0.

In these embodiments, the first vertical distance between the left eye object and the plane where the display area of the multimedia device is located in the vertical direction, and the second vertical distance between the right eye object and the plane where the display area of the multimedia device is located in the vertical direction are calculated according to the spatial frequency spectrum. As shown in FIG. 3, taking the center of the display area of the multimedia device as the coordinate origin (0, 0, 0), the process of calculating the first vertical distance and the second vertical distance is described in detail:

(1) Both the left eye object and the right eye object are images composed of pixel matrices, the first pixel value corresponding to the left eye object is represented by L(s, t), and the second pixel value corresponding to the right eye object is represented by R(s, t), "s" and "t" represent the row and column coordinates of the pixel.

(2) The grayscale information of the first pixel value L(s, t) is represented by GL(s, t), and the grayscale information of the second pixel value R(s, t) is represented by GR(s, t).

(3) The first average grayscale value of the left eye object is represented by $$GL\_avg = \frac{1}{S*T}\sum_{s=0}^{S-1}\sum_{t=0}^{T-1}D*e^{-j*2\pi\left(\frac{s*g}{S}+\frac{t*l}{T}\right)};$$

The first average grayscale value of the right eye object is represented by $$GR\_avg = \frac{1}{S*T}\sum_{s=0}^{S-1}\sum_{t=0}^{T-1}GR(s,t);$$

and S and T are the maximum coordinates of the image pixel of the left eye object and the image pixel of the right eye object.

(4) The first grayscale difference of the left eye object image pixel L(s, t) is represented by GL(s, t)_alt=GL(s, t)-GL_avg, and the second grayscale difference of the right eye object image pixel R(s, t) is represented by GR(s, t)_alt=GR(s, t)-GR_avg.

(5) The first spatial frequency of the left eye object is represented by $$UL(g,l) = \sum_{s=0}^{S-1}\sum_{t=0}^{T-1}K*e^{-j*2\pi\left(\frac{s*g}{S}+\frac{t*l}{T}\right)},$$

wherein K represents GL(s, t)_alt, the second spatial frequency of the left eye object is represented by $$UR(g,l) = \sum_{s=0}^{S-1}\sum_{t=0}^{T-1}D*e^{-j*2\pi\left(\frac{s*g}{S}+\frac{t*l}{T}\right)},$$

wherein D represents GR(s, t)_alt, and "g" can be 0, 1, 2 . . . , S-1, "l" can be 0, 1, 2 . . . , L-1.

(6) The maximum absolute value of UL(g, 1) is the first definition QL of the left eye object image, and the maximum absolute value of UR(g, 1) is the second definition QR of the right eye object image.

(7) The first vertical distance between the left eye object and the plane where the display area of the multimedia device is located in the vertical direction satisfies: QL=β(Lz)*Lz. The first vertical distance between the left eye object and the plane where the display area of the multimedia device is located in the vertical direction Lz can be obtained. Likewise, the second vertical distance between the right eye object and the plane where the display area of the multimedia device is located in the vertical direction Rz can be obtained.

Meanwhile, the third vertical distance in the vertical direction between the first background object and the plane where the display area of the multimedia device is located can also be calculated according to the above-mentioned first preset rule. Specifically, the first background object is also composed of a pixel matrix, the pixel value corresponding to the first background object is the first background object parameter B(u, v). u and v respectively represent the row and column coordinates of the pixel. By adopting the same method of calculating the distance between the left eye object or the right eye object and the plane where the display area of the multimedia device is located, the third vertical distance Bz in the vertical direction between the first background object and the plane where the display area of the multimedia device is located is obtained.

Follows are the specific description of the operations B1-B5:

The first pixel position corresponding to the left eye object in the frame image is the second parameter of the left eye object, and the second pixel position corresponding to the right eye object in the frame image is the second parameter of the right eye object.

Figure 8:
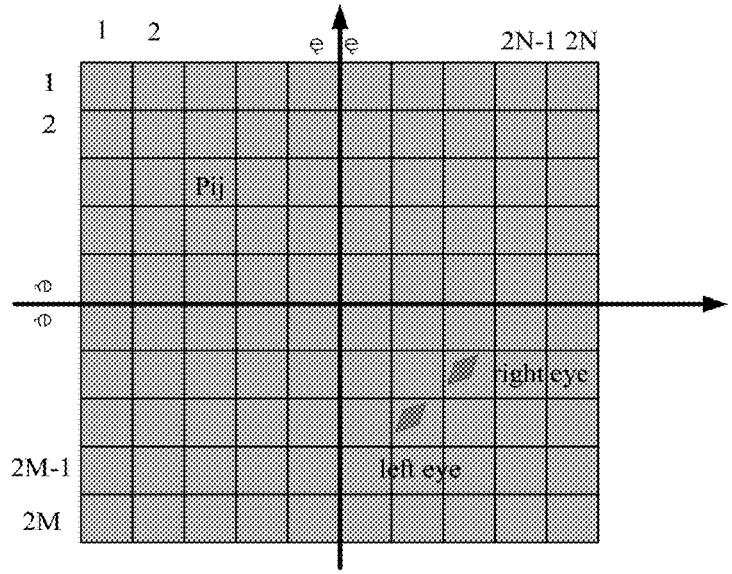
FIG. 8 is a schematic view of a pixel matrix of a frame image "P" according to an embodiment of the present disclosure.
Figure 9:
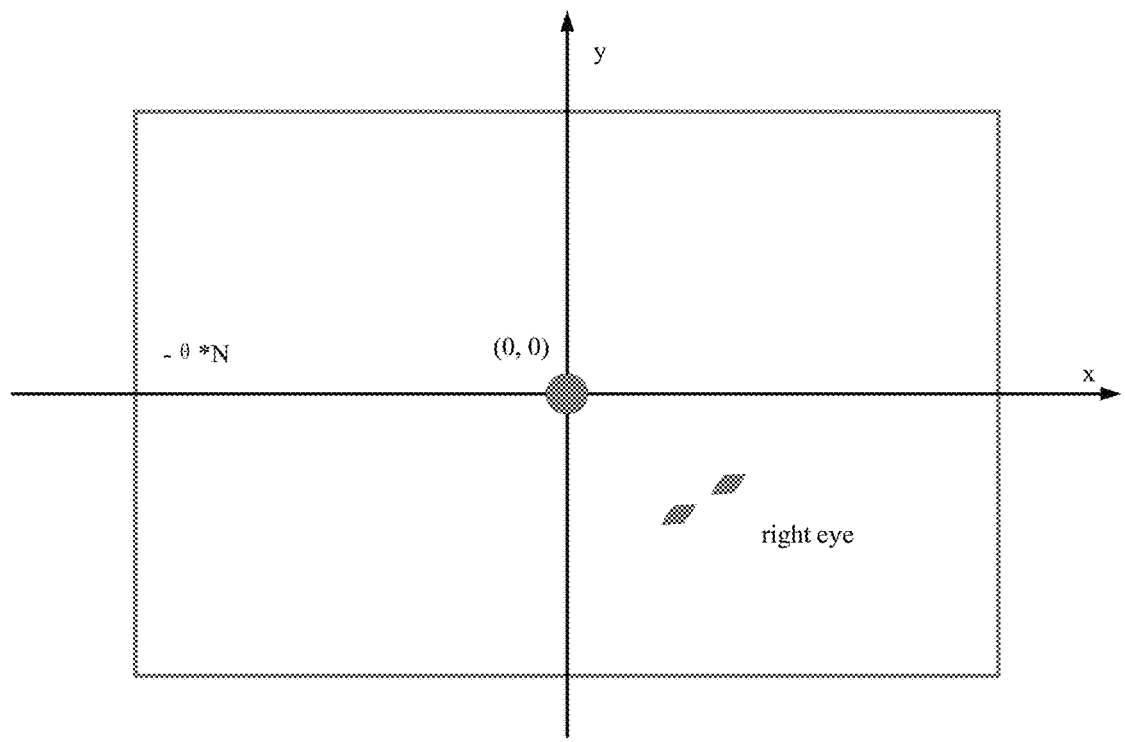
FIG. 9 is a schematic view of a "xy" plane coordinate of a frame image "P" according to an embodiment of the present disclosure.

As shown in FIG. 8 and FIG. 9, FIG. 8 is a schematic view of a pixel matrix of a frame image "P" according to an embodiment of the present disclosure and FIG. 9 is a schematic view of a "xy" plane coordinate of a frame image "P" according to an embodiment of the present disclosure. In combination of FIG. 8 and FIG. 9, the specific process of calculating the first direction coordinate of the left eye object projected on the plane where the display area of the multimedia device is located, and the second direction coordinate of the right eye object projected on the plane where the display area of the multimedia device is located will be described in detail:

(1) As shown in FIG. 8, the pixel matrix of the frame image "P" is 2M*2N, the frame image "P" is a planar image, and the pixel value of the frame image "P" is represented by Pij, wherein "i" can be 1, 2, 3, . . . , 2M, "j" can be 1, 2, 3, . . . , 2N.

(2) The first pixel position (P_Lm, P_Ln) corresponding to the left eye object in the frame image, and the second pixel position (P_Rm, P_Rn) corresponding to the right eye object in the frame image are obtained by finding the human eye object through the above human eye positioning operations.

(3) The center of the frame image "P" is taken as the center of the plane coordinate system and the position of the image pixels is converted into plane coordinates. The coordinate range of all pixels in the frame image "P" in the "x" direction is represented by (−θ*N, θ*N), the coordinate range in the "y" direction is represented by (−θ*M, θ*M) and θ represents a constant.

As shown in FIG. 9, the plane coordinates of the left eye object are represented by [θ*(P_Lm-M), θ*(P_Ln-N)], and the plane coordinates of the right eye object are represented by [θ*(P_Rm-M), θ*(P_Rn-N)].

(4) The above-mentioned third vertical distance Bz in the vertical direction between the first background object and the plane where the display area of the multimedia device is located, the first vertical distance between the left eye object and the plane where the display area of the multimedia device is located in the vertical direction Lz, and the second vertical distance between the right eye object and the plane where the display area of the multimedia device is located in the vertical direction Rz have been obtained.

Continuing to refer to FIG. 3, in the space coordinate system, the coordinate value Lx in the "x" direction and the coordinate value Ly in the "y" direction included in the first direction coordinates in which the left eye object is projected on the plane where the display area of the multimedia device is located are obtained:

$$Lx = \theta*(P\_Lm-M)*\frac{Lz}{Bz}; Ly = \theta*(P\_Ln-N)*\frac{Lz}{Bz}.$$

Likewise, in the space coordinate system, the coordinate value Rx in the "x" direction and the coordinate value Ry in the "y" direction included in the first direction coordinates in which the right eye object is projected on the plane where the display area of the multimedia device is located are obtained:

$$Rx = \theta*(P\_Rm-M)*\frac{Lz}{Bz}; Ry = \theta*(P\_Rn-N)*\frac{Lz}{Bz}.$$

(5) Through the above coordinate calculation, the first spatial positional data (Lx, Ly, Lz) of the left eye object based on the multimedia device and the second spatial positional data (Rx, Ry, Rz) of the right eye object based on the multimedia device are obtained.

In combination with the above embodiments, after obtaining the first spatial positional data (Lx, Ly, Lz) of the left eye object based on the multimedia device and the second spatial positional data (Rx, Ry, Rz) of the right eye object based on the multimedia device, In one embodiment, the deflection coefficient of the to-be-displayed video image can be determined according to the following formulas:

$$\phi_x = \lambda*\arctan\left(\frac{L_x+R_x}{L_z+R_z}\right);$$

$$\phi_y = \lambda*\arctan\left(\frac{L_y+R_y}{L_z+R_z}\right);$$

Wherein Φx represents a deflection coefficient of the to-be-displayed video image in a horizontal direction, Φy represents a deflection coefficient of the to-be-displayed video image in a vertical direction, λ, represents a preset value, Lx, Ly and Lz cooperatively represent the spatial positional data of the left eye object relative to the multimedia device, and Rx, Ry and Rz cooperatively represent the spatial positional data of the right eye object relative to the multimedia device.

The operation of determining the deflection coefficient of the video image to be displayed is described in detail below:

(1) Space coordinate values of the middle point of the left eye object and the right eye object is represented by (AVG_x, AVG_y, AVG_z), wherein:

$$AVG\_x = \frac{Lx+Rx}{2}; AVG\_y = \frac{Ly+Ry}{2}; AVG\_z = \frac{Lz+Rz}{2}.$$

(2) The deflection coefficient is calculated to obtain a horizontal deflection coefficient represented by Φx and a vertical deflection coefficient represented by Φy, wherein:

$$\Phi x = \lambda*\arctan\left(\frac{AVG\_x}{AVG\_z}\right) = \lambda*\arctan\left(\frac{Lx+Rx}{Lz+Rz}\right),$$

which represents the angle between the center point of the left and right eyes and the center point of the display area directly in front of the horizontal deviation.

$$\Phi y = \lambda*\arctan\left(\frac{AVG\_y}{AVG\_z}\right) = \lambda*\arctan\left(\frac{Ly+Ry}{Lz+Rz}\right),$$

which represents the angle between the center point of the left and right eyes and the center point of the display area directly in front of the vertical deviation.

Wherein λ represents a set value.

Through the calculation of the above coefficients, a horizontal deflection coefficient and a vertical deflection coefficient are obtained, and then the video image to be displayed can be deflected according to the deflection coefficients to obtain a deflected target video image, thereby to display the target video image.

Figure 10:
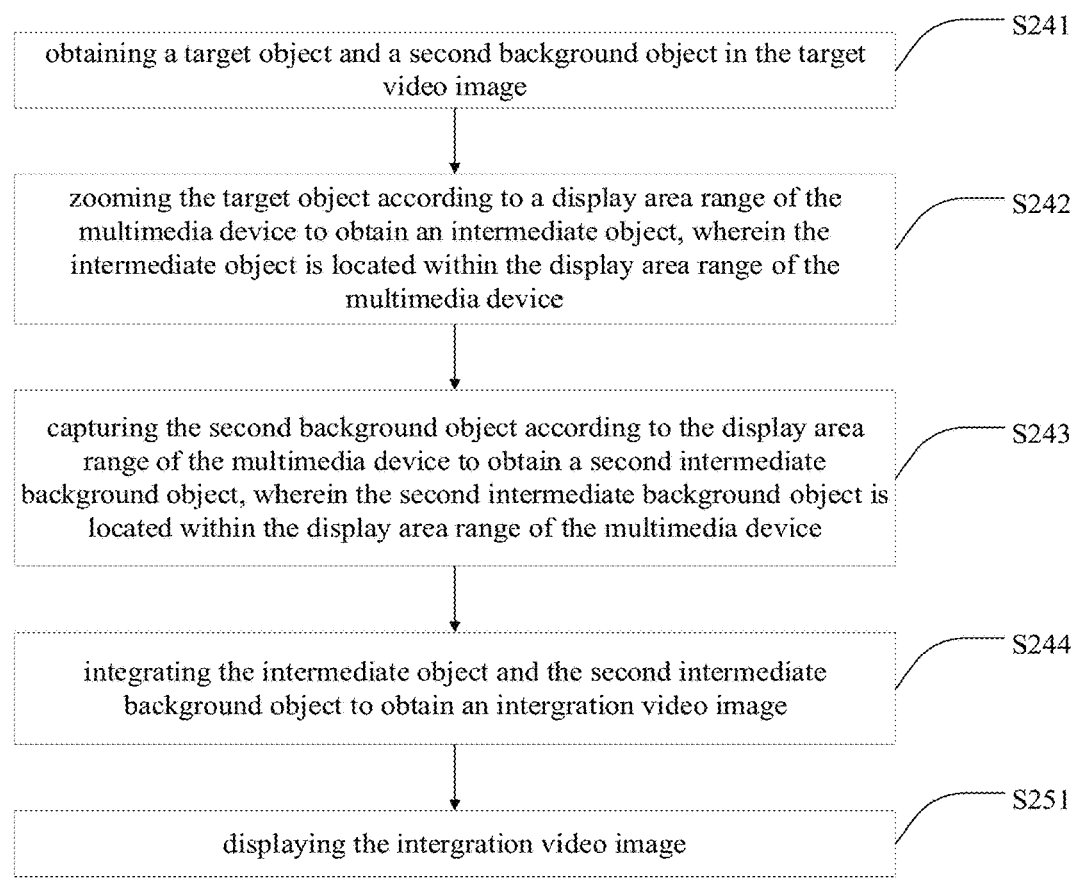
FIG. 10 is a schematic flowchart of a video image display method according to an embodiment of the present disclosure.

As shown in FIG. 10, FIG. 10 is a schematic flowchart of a video image display method according to an embodiment of the present disclosure. In addition, considering the different sizes of video images to be displayed, the original size of some video images is relatively large when displayed in the display area. If only the video image to be displayed is deflected, the display object that the user pays attention to in the video image may not be completely displayed. Therefore, in order to ensure that the video image to be displayed can be completely displayed after deflection processing, in one embodiment, after performing the above operation S24, the video image display method of the present disclosure further includes the following operations:

Operation S241, obtaining a target object and a second background object in the target video image;

Operation S242, zooming the target object according to a display area range of the multimedia device to obtain an intermediate object, wherein the intermediate object is located within the display area range of the multimedia device;

Operation S243, capturing the second background object according to the display area range of the multimedia device to obtain a second intermediate background object, wherein the second intermediate background object is located within the display area range of the multimedia device;

Operation S244, integrating the intermediate object and the second intermediate background object to obtain an intergration video image;

Accordingly, the operation S25 may specifically include the operation S251, displaying the intergration video image.

In these embodiments, the video image includes multiple video frames, that is to say, the deflection of the video image in this disclosure can be regarded as the deflection of multiple video frames in the video image respectively, thereby to finally realize the deflection of the video image.

The target object refers to the preset object that appears in the target video image VP_R, and it is usually the object that people pay attention to when watching the video image. The second background object refers to the background object of the target video image VP_R except the object. Both the target object and the second background object can be set as required. For example, in a video image about a person, the target object is the person himself, and the second background object can be backgrounds such as walls and sofas and others behind the person. In a video image about a building, the target object is the building itself, and the second background object may be the sky.

Specifically, in these embodiments, the target object in the target video image VP_R can be identified in the same manner as the human eye object identification in the aforementioned operations A1-A7. That is to say, the target object in the target video image VP_R can be identified according to the brightness and brightness change information of the pixels of the target video image VP_R, and the object outline Information and others. The second background image can be separated and acquired from the target video image VP_R according to the occlusion and spatial position of the object in the target video image VP_R.

Then, according to the size of the display area, the obtained objects are scaled, such that the scaled intermediate objects can be fully displayed on the display screen to ensure that the object information that people pay attention to in the video image will not be lost, thereby to ensure a good viewing experience for users and the displaying effect of multimedia device.

In addition, after the deflection, the second background object will exceed the display area. Therefore, in these embodiments of the present disclosure, the second background object beyond the display area can also be intercepted, and only the second intermediate background object displayed within the display area can be retained.

Figure 12:
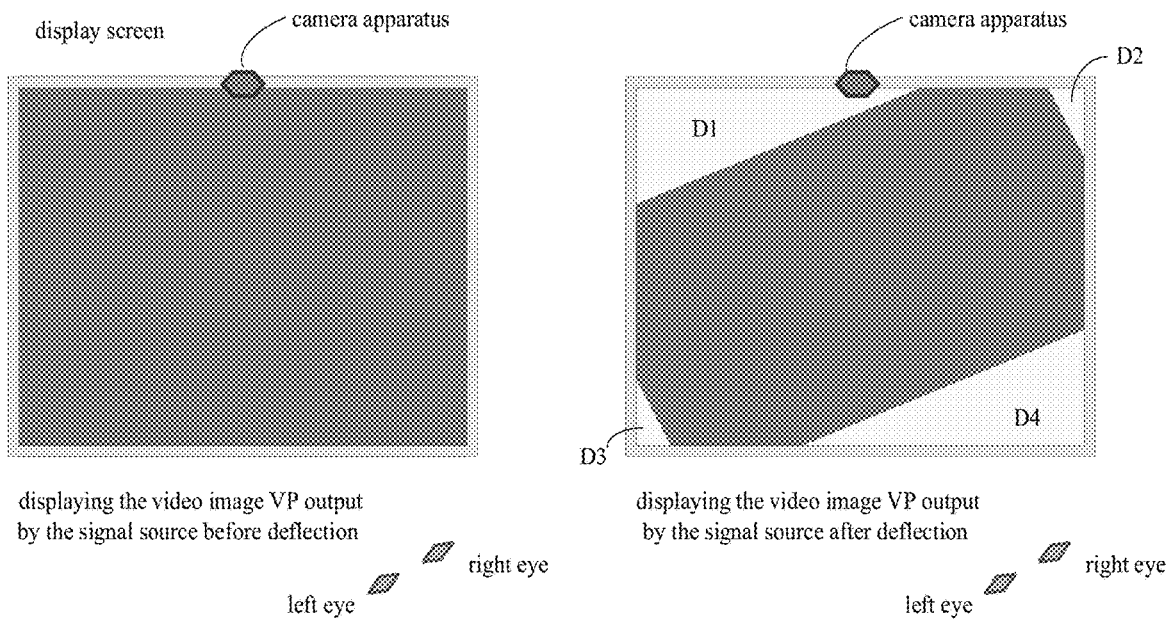
FIG. 12 is a schematic displaying view of video images before and after deflecting according to an embodiment of the present disclosure.

For example, as shown in FIG. 12, which is a schematic displaying view of video images before and after deflecting according to an embodiment of the present disclosure. As shown in left part of FIG. 12 which shows a traditional display method, even though the human eyes are not directly in front of the video image, the original video image VP (rectangular area in the left picture) will not be deflected. VP is a pixel matrix and corresponds to the pixels in the display area. In the right picture of FIG. 12, the human eyes are not directly in front of the video image, but the original video image VP is deflected (the deflected rectangular area as shown in the right figure), and 4 corners of the rectangular area are cut off, that is to say, the rectangular area with 4 corners removed in the figure is the second intermediate background object.

Sequentially, after obtaining the intermediate object and the second intermediate background object, the intermediate object and the second intermediate background object can be fused to obtain the fused video image VP_Z (the rectangular area with 4 corners cut in FIG. 12). Finally, the multimedia device can display the fused video image VP_Z in the display area.

By adopting the video image display method of these embodiments, after the video image to be displayed is subjected to deflection processing to obtain the target video image, the object and the second background object in the target video image can be further identified, and the target object can be zoomed and the second background object can be intercepted, thereby to ensure that the display area can fully display the object information that people care about, and ensure that the object information people care about in the video image will not be lost, so as to ensure the viewing experience of the user as much as possible and the display effect of the multimedia device.

Figure 11:
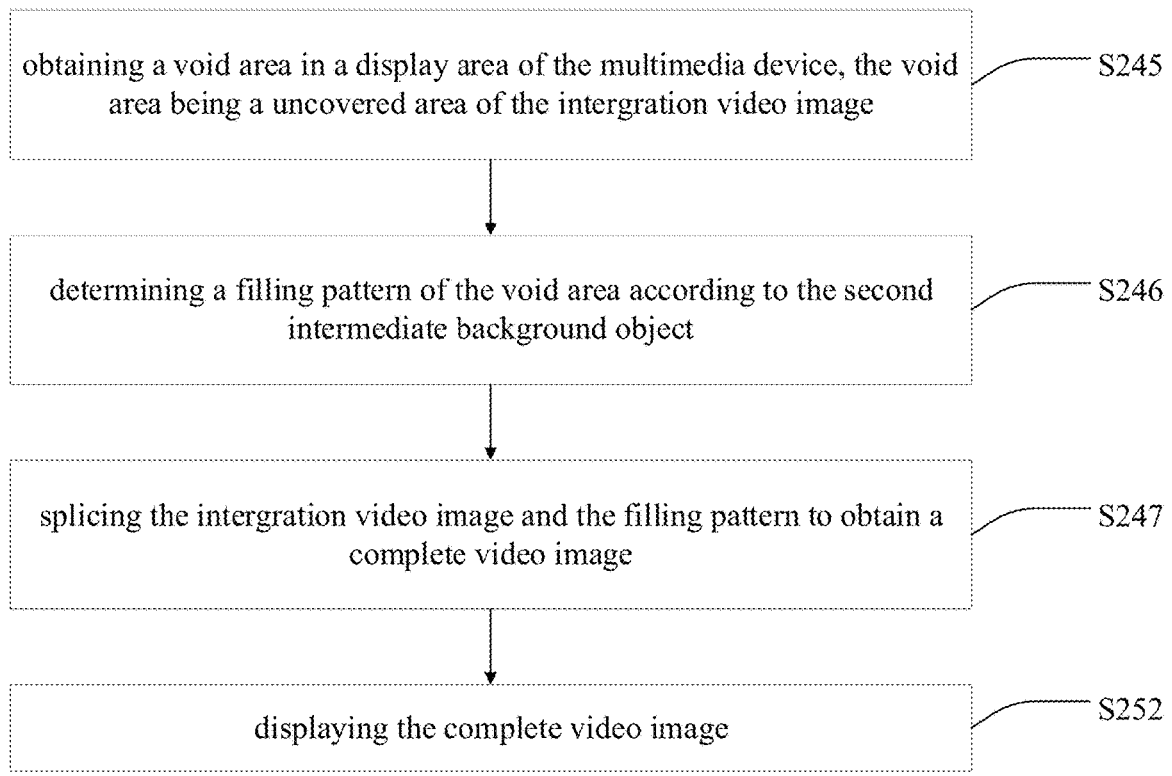
FIG. 11 is a schematic flowchart of a video image display method according to an embodiment of the present disclosure.

As shown in FIG. 11, FIG. 11 is a schematic flowchart of a video image display method according to an embodiment of the present disclosure. In addition, it is further considered that there will be a void area in the display area after the scaling process is performed on the object and the interception process is performed on the second background object. Referring to the D1, D2, D3 and D4 areas in FIG. 12, if the void area is displayed, the user's viewing experience will be affected. Therefore, in order to further improve the user's viewing experience and improve the display effect of the multimedia device, in one embodiment, after the above operation S244, the video image display method of the embodiment of the present disclosure can also include the following operations:

Operation S245, obtaining a void area in a display area of the multimedia device, the void area being a uncovered area of the intergration video image;

Operation S246, determining a filling pattern of the void area according to the second intermediate background object;

Operation S247, splicing the intergration video image and the filling pattern to obtain a complete video image;

Accordingly, the operation S25 may specifically include operation S252, displaying the complete video image.

In this embodiment, as shown in FIG. 12, the area that cannot be covered by the fused video image is the void area, that is, the areas D1, D2, D3 and D4 in FIG. 12.

Firstly, the area positions of the void areas D1, D2, D3, and D4 in the display area are obtained. Then the new pixels are calculated by interpolation according to the texture, brightness, and brightness change information of the second intermediate background object and others. The void areas D1, D2, D3, and D4 are filled with new pixels to obtain the filled image of the void areas D1_P, D2_P, D3_P, D4_P (the light gray areas filled at D1, D2, D3, and D4 as shown in the right figure of FIG. 7) after smoothing, blurring and other processing.

It should be noted that in this embodiment, four void areas D1, D2, D3, and D4 are taken as an example for illustration. In some possible embodiments, the number of void areas can be one, two, three, five or any other numbers.

Finally, the video image VP_Z and the void-filled images D1_P, D2_P, D3_P, and D4_P are spliced into one image, and the splicing edges of the spliced images are smoothed. After the spliced images are denoised and smoothed, the object contours of the spliced images are increased, and the colors of the spliced image are enhanced, a new complete video image VP_A (the overall image shown in the right figure of FIG. 12) is generated.

By adopting the video image display method of these embodiments, since the filling pattern determined according to the second intermediate background object is used to fill the void area of the display area. Such that the finally displayed image can restore to the original video image to be displayed as much as possible, thereby further improving the user's viewing experience and improving the display effect of multimedia device.

As shown in FIG. 13, FIG. 13 is a schematic flowchart of a principle of a video image display method according to an embodiment of the present disclosure. FIG. 13 uses a practical example to describe the principle of the video image display method of the present disclosure in detail:

Firstly, the image is acquired by using a TV camera apparatus to capture the scene viewed by the user; converting the optical signal image into an electrical signal image; performing noise reduction, signal enhancement, white balance correction and other processing to obtain the frame image "P" and the pixel matrix of the frame image "P", which is 2M*2N, and outputting the frame image "P".

Then the spatial coordinates of the human eye are obtained by performing object recognition, face recognition, and human eye positioning on the frame image P to obtain the left eye object and the right eye object. The coordinate of the center point of the TV display screen is set to (0, 0, 0), the actual spatial coordinate positions of the left eye and right eye objects are calculated by referring to the center point of the display screen by the following operations: firstly, calculating the z-direction coordinate values Lz and Rz according to the spatial spectrum analysis of the left eye object and the right eye object; then converting the position of the frame image "P" pixel into a plane coordinate value, and calculating the x-direction coordinate values Lx and Rx and the y-direction coordinate values Ly and Ry; and finally obtaining and outputting the three-dimensional space coordinates (Lx, Ly, Lz) of the left eye object and the three-dimensional space coordinates (Rx, Ry, Rz) of the right eye object.

Sequentially coefficient is obtained, that is, the deflection coefficient (or angle) between the center point of the left eye and the display screen in the horizontal and vertical directions is calculated by the following operations: firstly, based on the three-dimensional space coordinate values (Lx, Ly, Lz) of the left eye object and that (Rx, Ry, Rz) of the right eye object, obtaining the space coordinates of the center point (AVG_x, AVG_y, AVG_z) of the left and right eyes; then calculating the horizontal deflection coefficient Φx and the vertical deflection coefficient Φy, which respectively are horizontal and vertical angles between the center point of the left and right eyes and the center point of the display screen; and finally outputting the deflection coefficients Φx and Φy.

Further the video is conversed by the following operations: receiving the video image VP output by the signal source, rotating the video image VP according to the horizontal deflection Φx coefficient and the vertical deflection coefficient Φy, and then obtaining the video image VP_R which is directly facing the center of the left and right eyes. Since the rotated video image is VP_R is beyond the display range of the display screen, VP_R is scaled and intercepted to obtain VP_Z, according to the size range of the display screen. Such that the zoomed object can be fully displayed on the display screen, and the video content information will not be lost. When the video image VP_Z obtained through zooming and interception processing is displayed on the display screen, there is a void area D (such as D1_P, D2_P, D3_P, D4_P). Thus, the new pixel is obtained by interpolation calculation based on the background image of VP_Z, thereby to fill the void area D_P with new pixels to obtain a void-filled image. Finally, splicing and rendering VP_Z and D_P to generate a new video image VP_A and outputting the video-converted video image VP_A.

Finally, the video image is displayed: the display screen displays the video image VP_A after processing, and the user watches the video.

Based on the same creative concept, an embodiment of the present disclosure provides a video image display apparatus. As shown in FIG. 14, FIG. 14 is a schematic structural view of a video image display apparatus according to an embodiment of the present disclosure. The video image display apparatus 80 is applied to a multimedia device, and the video image display apparatus includes:

an acquisition module 81, configured to acquire a target image in a preset area;

a first determination module 82, configured to determine spatial positional data of a left eye object and a right eye object respectively relative to the multimedia device according to the target image, in response that the target image has the left eye object and the right eye object;

a second determination module 83, configured to determine a deflection coefficient of a to-be-displayed video image according to the spatial positional data of the left eye object and the right eye object respectively relative to the multimedia device;

a first obtaining module 84, configured to deflect the to-be-displayed video image according to the deflection coefficient to obtain a target video image after deflecting;

a display module 85, configured to display the target video image.

In one embodiment, the video image display apparatus includes:

a second obtaining module configured to process the target image according to a preset image-processing rule to obtain a frame image.

The first determination module includes:

a determination submodule, configured to determine the spatial positional data of the left eye object and the right eye object respectively relative to the multimedia device according to the frame image and a preset position-processing rule, in response that the target image has the left eye object and the right eye object.

In an embodiment, the preset position-processing rule includes a first preset rule and a second rule, and the determination submodule includes:

a first determination unit, configured to determine a first vertical distance between the left eye object and a plane where a display area of the multimedia device is located, in a direction perpendicular to the plane according to a first parameter of the left eye object in the frame image and the first preset rule; and determine a second vertical distance between the right eye object and the plane where a display area of the multimedia device is located, in the direction perpendicular to the plane according to a first parameter of the right eye object in the frame image and the first preset rule;

a second determination unit, configured to determine a first direction coordinate of the left eye object projected on the plane where the display area of the multimedia device is located, according to a second parameter of the left eye object in the frame image and the second preset rule; and determine a second direction coordinate of the right eye object projected on the plane where the display area of the multimedia device is located, according to a second parameter of the right eye object in the frame image and the second preset rule;

a third determination unit, configured to determine first spatial positional data of the left eye object relative to the multimedia device according to the first vertical distance and the first direction coordinate; and determine second spatial positional data of the right eye object relative to the multimedia device according to the second vertical distance and the second direction coordinate.

In one embodiment, the first determination unit includes:
a first acquisition subunit, configured to obtain a first pixel value corresponding to the left eye object; and obtaining a second pixel value corresponding to the right eye object;
a first determining subunit, configured to determine a first gray scale corresponding to the left eye object according to the first pixel value; and determine a second gray scale corresponding to the right eye object according to the second pixel value;
a second determination subunit configured to determine a first average grayscale corresponding to the left eye object according to the first gray scale; and determine a second average grayscale corresponding to the right eye object according to the second gray scale;
a third determination subunit, configured to determine a first grayscale difference corresponding to the left eye object according to the first gray scale and the first average grayscale; and determine a second grayscale difference corresponding to the right eye object according to the second gray scale and the second average grayscale;
a fourth determination subunit, configured to determine a first spatial frequency corresponding to the left eye object according to the first grayscale difference; and determine a second spatial frequency corresponding to the right eye object according to the second grayscale difference;
a fifth determination subunit, configured to determine a maximum absolute value of the first spatial frequency as a first definition corresponding to the left eye object; and determine a maximum absolute value of the second spatial frequency as a second definition corresponding to the right eye object;
a sixth determination subunit, configured to determine the first vertical distance between the left eye object and the plane where the display area of the multimedia device is located, in the direction perpendicular to the plane according to a preset function and the first definition; and determine the second vertical distance between the right eye object and the plane where the display area of the multimedia device is located, in the direction perpendicular to the plane according to a preset function and the second definition.

In one embodiment, the video image display apparatus further includes:
a third determination module, configured to determine a third vertical distance between a first background object and the plane where the display area of the multimedia device is located, in the direction perpendicular to the plane according to a first background object parameter in the frame image and the first preset rule.

The second determination unit includes:
a second acquisition subunit, configured to obtain a first pixel location corresponding to the left eye object in the frame image and a second pixel location corresponding to the right eye object in the frame image;
a coordinate system establishment subunit, configured to establish a plane coordinate system with a center of the frame image as a center of the plane coordinate system;
a seventh determination subunit, configured to determine a first plane coordinate of the left eye object on the plane coordinate system according to the first pixel location and the plane coordinate system; and determining a second plane coordinate of the right eye object on the plane coordinate system according to the second pixel location and the plane coordinate system;
an eighth subunit, configured to determine the first direction coordinate of the left eye object projected on the plane where the display area of the multimedia device is located, according to the first vertical distance, the third vertical distance and the first plane coordinate;
a ninth subunit, configured to determine the second direction coordinate of the right eye object projected on the plane where the display area of the multimedia device is located, according to the second vertical distance, the third vertical distance and the second plane coordinate.

In an embodiment, the second determination module is also configured for:
determining the deflection coefficient of the to-be-displayed video image according to the following formulas:

$$\phi_x = \lambda * \arctan\left(\frac{L_x + R_x}{L_z + R_z}\right);$$

$$\phi_y = \lambda * \arctan\left(\frac{L_y + R_y}{L_z + R_z}\right);$$

wherein Φx represents a deflection coefficient of the to-be-displayed video image in a horizontal direction, Φy represents a deflection coefficient of the to-be-displayed video image in a vertical direction, λ represents a preset value, Lx, Ly and Lz cooperatively represent the spatial positional data of the left eye object relative to the multimedia device, and Rx, Ry and Rz cooperatively represent the spatial positional data of the right eye object relative to the multimedia device.

In one embodiment, the video image display apparatus further includes:
a first obtaining module, configured to obtain a target object and a second background object in the target video image;
a scaling module, configured to zoom the target object according to a display area range of the multimedia device to obtain an intermediate object, wherein the intermediate object is located within the display area range of the multimedia device;
a capturing module, configured to capture the second background object according to the display area range of the multimedia device to obtain a second intermediate background object, wherein the second intermediate background object is located within the display area range of the multimedia device;
an integration module, configured to integrate the intermediate object and the second intermediate background object to obtain an intergration video image.

The display module includes:
a first display submodule configured to display the intergration video image.

In one embodiment, the video image display apparatus further includes:
a second acquisition module configured to obtain a void area in a display area of the multimedia device, the void area being a uncovered area of the intergration video image;
a fourth determining module, configured to determine a filling pattern of the void area according to the second intermediate background object;

a splicing module, configured to splice the intergration video image and the filling pattern to obtain a complete video image.

The display module includes:
a second display submodule configured to display the complete video image.

As for the apparatus embodiment, since it is basically similar to the method embodiment, the description is relatively simple, and for related parts, please refer to the part of the description of the method embodiment.

The above are only some embodiments of the present disclosure, and do not limit the scope of the present disclosure thereto. Under the concept of the present disclosure, equivalent structural transformations made according to the description and drawings of the present disclosure, or direct/ indirect disclosure in other related technical fields are included in the scope of the present disclosure.

What is claimed is:

1. A video image display method applied to a multimedia device, comprising:
    acquiring a target image in a preset area;
    processing the target image according to a preset image-processing rule to obtain a frame image;
    determining a first vertical distance between a left eye object and a plane where a display area of the multimedia device is located, in a direction perpendicular to the plane according to a first parameter of the left eye object in the frame image and a first preset rule;
    determining a first direction coordinate of the left eye object projected on the plane where the display area of the multimedia device is located, according to a second parameter of the left eye object in the frame image and a second preset rule; and
    determining first spatial positional data of the left eye object relative to the multimedia device according to the first vertical distance and the first direction coordinate;
    determining a deflection coefficient of a to-be-displayed video image according to the spatial positional data of the left eye object relative to the multimedia device;
    deflecting the to-be-displayed video image according to the deflection coefficient to obtain a target video image after deflecting; and
    displaying the target video image.

2. The video image display method of claim 1, wherein the operation of determining the first vertical distance between the left eye object and the plane where the display area of the multimedia device is located, in the direction perpendicular to the plane according to the first parameter of the left eye object in the frame image and the first preset rule comprises:
    obtaining a first pixel value corresponding to the left eye object;
    determining a first gray scale corresponding to the left eye object according to the first pixel value;
    determining a first average grayscale corresponding to the left eye object according to the first gray scale;
    determining a first grayscale difference corresponding to the left eye object according to the first gray scale and the first average grayscale;
    determining a first spatial frequency corresponding to the left eye object according to the first grayscale difference;
    determining a maximum absolute value of the first spatial frequency as a first definition corresponding to the left eye object; and determining the first vertical distance between the left eye object and the plane where the display area of the multimedia device is located, in the direction perpendicular to the plane according to a preset function and the first definition.

3. The video image display method of claim 1, wherein the video image display method further comprises:
    determining a third vertical distance between a first background object and the plane where the display area of the multimedia device is located, in the direction perpendicular to the plane according to a first background object parameter in the frame image and the first preset rule.

4. The video image display method of claim 3, wherein the operation of determining the first direction coordinate of the left eye object projected on the plane where the display area of the multimedia device is located, according to the second parameter of the left eye object in the frame image and the second preset rule comprises:
    obtaining a first pixel location corresponding to the left eye object in the frame image;
    establishing a plane coordinate system with a center of the frame image as a center of the plane coordinate system;
    determining a first plane coordinate of the left eye object on the plane coordinate system according to the first pixel location and the plane coordinate system; and
    determining the first direction coordinate of the left eye object projected on the plane where the display area of the multimedia device is located, according to the first vertical distance, the third vertical distance and the first plane coordinate.

5. The video image display method of claim 1, wherein after the operation of deflecting the to-be-displayed video image according to the deflection coefficient to obtain the target video image after deflecting, the video image display method further comprises:
    obtaining a target object and a second background object in the target video image;
    zooming the target object according to a display area range of the multimedia device to obtain an intermediate object, wherein the intermediate object is located within the display area range of the multimedia device;
    capturing the second background object according to the display area range of the multimedia device to obtain a second intermediate background object, wherein the second intermediate background object is located within the display area range of the multimedia device; and
    integrating the intermediate object and the second intermediate background object to obtain an intergration video image;
    wherein the operation of displaying the target video image comprises:
    displaying the intergration video image.

6. The video image display method of claim 5, wherein after the operation of integrating the intermediate object and the second intermediate background object to obtain the intergration video image, the video image display method further comprises:
    obtaining a void area in a display area of the multimedia device, the void area being an area not covered by the intergration video image;
    determining a filling pattern of the void area according to the second intermediate background object; and
    splicing the intergration video image and the filling pattern to obtain a complete video image;

wherein the operation of displaying the target video image comprises:

displaying the complete video image.

7. A multimedia device, wherein the multimedia device comprises a memory, a processor, and a video image display program stored on the memory and executed by the processor, the processor, when executing the video image display program, implements operations of the video image display method of claim 1.

8. A non-transitory storage medium, wherein the non-transitory storage medium stores a video image display program, when the video image display program is executed by a processor, the processor implements operations of the video image display method of claim 1.

9. A video image display method applied to a multimedia device, comprising:

acquiring a target image in a preset area;

processing the target image according to a preset image-processing rule to obtain a frame image;

determining a second vertical distance between a right eye object and a plane where a display area of the multimedia device is located, in a direction perpendicular to the plane according to a first parameter of the right eye object in the frame image and a first preset rule;

determining a second direction coordinate of the right eye object projected on the plane where the display area of the multimedia device is located, according to a second parameter of the right eye object in the frame image and a second preset rule;

determining second spatial positional data of the right eye object relative to the multimedia device according to the second vertical distance and the second direction coordinate;

determining a deflection coefficient of a to-be-displayed video image according to the spatial positional data of the right eye object relative to the multimedia device;

deflecting the to-be-displayed video image according to the deflection coefficient to obtain a target video image after deflecting; and displaying the target video image.

10. The video image display method of claim 9, wherein the operation of determining the second vertical distance between the right eye object and the plane where the display area of the multimedia device is located, in the direction perpendicular to the plane according to the first parameter of the right eye object in the frame image and the first preset rule comprises:

obtaining a second pixel value corresponding to the right eye object;

determining a second gray scale corresponding to the right eye object according to the second pixel value;

determining a second average grayscale corresponding to the right eye object according to the second gray scale;

determining a second grayscale difference corresponding to the right eye object according to the second gray scale and the second average grayscale;

determining a second spatial frequency corresponding to the right eye object according to the second grayscale difference;

determining a maximum absolute value of the second spatial frequency as a second definition corresponding to the right eye object; and determining the second vertical distance between the right eye object and the plane where the display area of the multimedia device is located, in the direction perpendicular to the plane according to a preset function and the second definition.

11. The video image display method of claim 9, wherein the video image display method further comprises:

determining a third vertical distance between a first background object and the plane where the display area of the multimedia device is located, in the direction perpendicular to the plane according to a first background object parameter in the frame image and the first preset rule.

12. The video image display method of claim 11, wherein the operation of determining the second direction coordinate of the right eye object projected on the plane where the display area of the multimedia device is located, according to the second parameter of the right eye object in the frame image and the second preset rule comprises:

obtaining a second pixel location corresponding to the right eye object in the frame image;

establishing a plane coordinate system with a center of the frame image as a center of the plane coordinate system;

determining a second plane coordinate of the right eye object on the plane coordinate system according to the second pixel location and the plane coordinate system; and determining the second direction coordinate of the right eye object projected on the plane where the display area of the multimedia device is located, according to the second vertical distance, the third vertical distance and the second plane coordinate.

13. The video image display method of claim 9, wherein after the operation of deflecting the to-be-displayed video image according to the deflection coefficient to obtain the target video image after deflecting, the video image display method further comprises:

obtaining a target object and a second background object in the target video image;

zooming the target object according to a display area range of the multimedia device to obtain an intermediate object, wherein the intermediate object is located within the display area range of the multimedia device;

capturing the second background object according to the display area range of the multimedia device to obtain a second intermediate background object, wherein the second intermediate background object is located within the display area range of the multimedia device; and integrating the intermediate object and the second intermediate background object to obtain an intergration video image;

wherein the operation of displaying the target video image comprises:

displaying the intergration video image.

14. The video image display method of claim 13, wherein after the operation of integrating the intermediate object and the second intermediate background object to obtain the intergration video image, the video image display method further comprises:

obtaining a void area in a display area of the multimedia device, the void area being an area not covered by the intergration video image;

determining a filling pattern of the void area according to the second intermediate background object; and splicing the intergration video image and the filling pattern to obtain a complete video image;

wherein the operation of displaying the target video image comprises:

displaying the complete video image.

15. A multimedia device, wherein the multimedia device comprises a memory, a processor, and a video image display program stored on the memory and executed by the processor, the processor, when executing the video image display program, implements operations of the video image display method of claim 9.

16. A non-transitory storage medium, wherein the non-transitory storage medium stores a video image display program, when the video image display program is executed by a processor, the processor implements operations of the video image display method of claim 9.

17. A video image display method applied to a multimedia device, comprising:
    acquiring a target image in a preset area;
    in response that the target image has a left eye object and a right eye object, determining spatial positional data of the left eye object and the right eye object respectively relative to the multimedia device according to the target image;
    determining a deflection coefficient of a to-be-displayed video image according to the spatial positional data of the left eye object and the right eye object respectively relative to the multimedia device;
    deflecting the to-be-displayed video image according to the deflection coefficient to obtain a target video image after deflecting; and
    displaying the target video image,
    wherein the operation of determining the deflection coefficient of the to-be-displayed video image according to the spatial positional data of the left eye object and the right eye object respectively relative to the multimedia device comprises:
    determining the deflection coefficient of the to-be-displayed video image according to the following formulas:

$$\phi_x = \lambda * \arctan\left(\frac{L_x + R_x}{L_z + R_z}\right);$$

$$\phi_y = \lambda * \arctan\left(\frac{L_y + R_y}{L_z + R_z}\right);$$

wherein Φx represents a deflection coefficient of the to-be-displayed video image in a horizontal direction,
Φy represents a deflection coefficient of the to-be-displayed video image in a vertical direction,
λ represents a preset value,
Lx, Ly and Lz cooperatively represent the spatial positional data of the left eye object relative to the multimedia device, and
Rx, Ry and Rz cooperatively represent the spatial positional data of the right eye object relative to the multimedia device.

18. The video image display method of claim 17, wherein after the operation of deflecting the to-be-displayed video image according to the deflection coefficient to obtain the target video image after deflecting, the video image display method further comprises:
    obtaining a target object and a second background object in the target video image;
    zooming the target object according to a display area range of the multimedia device to obtain an intermediate object, wherein the intermediate object is located within the display area range of the multimedia device;
    capturing the second background object according to the display area range of the multimedia device to obtain a second intermediate background object, wherein the second intermediate background object is located within the display area range of the multimedia device; and
    integrating the intermediate object and the second intermediate background object to obtain an intergration video image;
    wherein the operation of displaying the target video image comprises:
    displaying the intergration video image.

19. The video image display method of claim 18, wherein after the operation of integrating the intermediate object and the second intermediate background object to obtain the intergration video image, the video image display method further comprises:
    obtaining a void area in a display area of the multimedia device, the void area being an area not covered by the intergration video image;
    determining a filling pattern of the void area according to the second intermediate background object; and
    splicing the intergration video image and the filling pattern to obtain a complete video image;
    wherein the operation of displaying the target video image comprises:
    displaying the complete video image.

20. A multimedia device, wherein the multimedia device comprises a memory, a processor, and a video image display program stored on the memory and executed by the processor, the processor, when executing the video image display program, implements operations of the video image display method of claim 17.

* * * * *